(12) United States Patent
Birkhold et al.

(10) Patent No.: US 12,333,782 B2
(45) Date of Patent: Jun. 17, 2025

(54) PROVISION OF A COMPARISON DATASET

(71) Applicant: Siemens Healthcare GmbH, Erlangen (DE)

(72) Inventors: Annette Birkhold, Stuttgart (DE); Markus Kowarschik, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 336 days.

(21) Appl. No.: 17/949,323

(22) Filed: Sep. 21, 2022

(65) Prior Publication Data
US 2023/0102646 A1  Mar. 30, 2023

(30) Foreign Application Priority Data
Sep. 29, 2021  (DE) ..................... 10 2021 210 879.2

(51) Int. Cl.
*G06V 10/75* (2022.01)
*G06T 7/254* (2017.01)
(Continued)

(52) U.S. Cl.
CPC ............ *G06V 10/751* (2022.01); *G06T 7/254* (2017.01); *G06T 7/38* (2017.01); *G06V 10/25* (2022.01);
(Continued)

(58) Field of Classification Search
CPC ...... G06V 10/751; G06V 10/25; G06T 7/254; G06T 7/38; G06T 2207/20224;
(Continued)

(56) References Cited

U.S. PATENT DOCUMENTS

| 2009/0016587 A1* | 1/2009 | Strobel ..................... G06T 7/20 382/130 |
| 2012/0020462 A1 | 1/2012 | Hansis et al. |
| 2018/0199905 A1 | 7/2018 | Kowarschik et al. |

FOREIGN PATENT DOCUMENTS

| DE | 102011081730 B4 | 3/2017 |
| DE | 102017200489 A1 | 7/2018 |

(Continued)

OTHER PUBLICATIONS

Stankovic, Z., Allen, B.D., Garcia, J., Jarvis, K.B. and Markl, M., 2014. 4D flow imaging with MRI. Cardiovascular diagnosis and therapy, 4(2), p. 173.*

(Continued)

*Primary Examiner* — Zhitong Chen
(74) *Attorney, Agent, or Firm* — Lempia Summerfield Katz LLC

(57) ABSTRACT

A method for providing a comparison dataset is disclosed. The method includes providing a time-resolved first dataset that maps a first contrast medium flow in a region of interest of an examination object in a first period of time; providing a time-resolved second dataset that maps a second contrast medium flow in the region of interest in a second period of time after the first period of time; spatially registering the first and second datasets; identifying a mapping of at least one vessel section of the region of interest in the first and second datasets; temporally registering the first and second datasets; identifying a difference between the first and second contrast medium flows by a comparison of the registered first and second datasets; and providing the comparison dataset based on the registered first and second datasets, wherein the comparison dataset has at least one parameter characterizing the difference.

13 Claims, 10 Drawing Sheets

(51) Int. Cl.
*G06T 7/38* (2017.01)
*G06V 10/25* (2022.01)

(52) U.S. Cl.
CPC .............. *G06T 2207/20224* (2013.01); *G06T 2207/30104* (2013.01)

(58) Field of Classification Search
CPC . G06T 2207/30104; G06T 2207/10072; G06T 2207/10132
See application file for complete search history.

(56) References Cited

FOREIGN PATENT DOCUMENTS

DE 102020216011 A1 11/2021
EP 2369994 B1 2/2013

OTHER PUBLICATIONS

Perperidis, D., 2005. Spatio-temporal registration and modelling of the heart using cardiovascular MR imaging. Imperial College.*
Dr. Markus Kowarschik, et al. "Approach for image-based quantitative evaluation of intravascular interventions" Aug. 31, 2011. pp. 1-10, with translation.

* cited by examiner

PROVISION OF A COMPARISON DATASET

The present patent document claims the benefit of German Patent Application No. 10 2021 210 879.2, filed Sep. 29, 2021, which is hereby incorporated by reference in its entirety.

TECHNICAL FIELD

The present disclosure relates to a method for provision of a comparison dataset, to a provision unit, to a medical imaging device, and to a computer program product.

BACKGROUND

For detection of changes in a region of interest (ROI) of an examination object, (e.g., a human and/or animal patient), differential imaging methods, (e.g., x-ray-based methods), are frequently employed, for example, a Digital Subtraction Angiography (DSA). The change to be detected may include a propagation movement and/or flow movement of a contrast medium, in particular a contrast medium flow, in a vessel section of the examination object. With DSA, a mask image is frequently subtracted from one or more fill images and a differential image is provided, wherein the mask image maps the region of interest without and the at least one fill image maps the region of interest with a contrast medium arranged therein. For mapping a temporal dynamic of the contrast medium flow, (e.g., a flooding of the contrast medium flow), frequently a number of fill images are recorded in the region of interest in a chronological sequence and combined with the mask image into a time-resolved differential image.

Frequently, a preoperative DSA is carried out for, in particular, preoperative planning of an in particular cerebrovascular treatment of vessel malformations, stenoses, aneurysms, or combinations thereof. In order to be able to further detect a change in the temporal dynamic of the contrast medium flow during or after the treatment of the vessel malformations and/or stenoses and/or aneurysms, a further DSA may be carried out pre- or intraoperatively. Frequently, the differential images of the first and of the further DSA are compared visually by a medical operator. Disadvantageously, in such cases, differences between the preoperative and the intraoperative or postoperative administration of contrast medium, (e.g., an injection time, an injection rate, contrast medium concentration, a catheter position, or combinations thereof), may lead to an incorrect comparison of the differential images. A quantitative analysis of the change in temporal dynamic of the contrast medium flow may be prevented or falsified by this.

SUMMARY AND DESCRIPTION

The underlying object of the disclosure is therefore to make possible a quantitative analysis of a changed temporal dynamic of contrast medium flows in a region of interest of an examination object.

The scope of the present disclosure is defined solely by the appended claims and is not affected to any degree by the statements within this summary. The present embodiments may obviate one or more of the drawbacks or limitations in the related art.

In a first aspect, the disclosure relates to an in particular computer-implemented method for provision of a comparison dataset. In this method, a first time-resolved dataset is provided, which maps a first contrast medium flow in a region of interest of an examination object in a first period of time. Moreover, a time-resolved second dataset is provided, which maps a second contrast medium flow in the region of interest of the examination object in a second period of time after the first period of time. Furthermore, the first and the second dataset are spatially registered in a further act. Moreover a mapping of at least one, (e.g., afferent), vessel section of the region of interest in the first and the second dataset is identified with the aid of a direction of a mapped flooding of the first and/or of the second contrast medium flow. The first and the second datasets are registered in time to minimize a temporal difference in the mapped flooding of the first and of the second contrast medium flow in the at least one vessel section. Furthermore, a difference between the first and second contrast medium flow is identified by a comparison of the registered first and second dataset. Hereafter, the comparison dataset is provided based on the registered first and second dataset. In this case, the comparison dataset has at least one parameter characterizing the difference.

In this aspect, the acts of the proposed method for provision of a comparison dataset described above may be carried out one after another and/or at least partly simultaneously. The acts of the proposed method may further be at least partly, in particular completely, computer-implemented.

The provision of the first dataset may include a receipt and/or a creation, in particular a reconstruction, of the first dataset. Moreover, the provision of the second dataset may include a receipt and/or creation, in particular a reconstruction, of the second dataset.

The receipt of the first and/or second dataset may include an acquisition and/or readout of a computer-readable data memory and/or a receipt from a data memory unit, for example, a database. The first and/or second dataset may further be provided by a provision unit of one or more medical imaging devices, in particular the same or different imaging modalities. The at least one medical imaging device may be configured, for example, as a Magnetic Resonance Tomography (MRT) installation and/or Computed Tomography (CT) installation and/or medical x-ray device and/or Positron Emission Tomography (PET) installation and/or ultrasound device.

As an alternative or in addition, the first dataset may be created, in particular reconstructed, from previously acquired first image data. In a similar way, the second dataset may be created, in particular reconstructed, from previously acquired second image data.

The time-resolved first dataset may map the region of interest of the examination object resolved spatially in two dimensions (2D) and/or three dimensions (3D). The examination object may be a human or animal patient. The region of interest may further include a spatial region of the examination object that has an anatomical object, e.g., an organ, in particular a hollow organ, and/or a tumor, and/or a predefined section of the anatomical object. Advantageously, the region of interest may include at least one vessel section, for example, an artery and/or vein. Moreover, the first dataset may map a region of interest in the first period of time, wherein the first period of time includes a number of first recording points. In this case, the first dataset may map the first contrast medium flow, in particular a propagation movement, in particular a flooding, and/or flow movement, of a contrast medium, in particular of a contrast medium bolus, in the region of interest during the first period of time. Advantageously, the first dataset may have a number of image points each with a time intensity curve, which map the first contrast medium flow in the region of interest as a temporal change in intensity in the at least one vessel section.

The time-resolved second dataset may map the region of interest of the examination object resolved spatially in two dimensions (2D) and/or three dimensions (3D). Moreover, the second dataset may map the region of interest in the second period of time, wherein the second period of time includes a number of second recording times. In this case, the second dataset may map the second contrast medium flow, (e.g., a propagation movement such as a flooding), and/or flow movement of a contrast medium, (e.g., of a contrast medium bolus), in the region of interest during the second period of time may have a number of image points each with a time intensity curve, which map the second contrast medium flow in the region of interest as a temporal change in intensity in the at least one vessel section.

The spatial registration of the first and of the second dataset may include a rigid and/or non-rigid transformation, (e.g., a translation, rotation, scaling, or combinations thereof), of the first and/or of the second dataset, in particular of the respective image points. Advantageously, the spatial registration may be based on anatomical and/or geometrical features mapped in the first and the second dataset. The anatomical features may include an organ, (e.g., a hollow organ), and/or an anatomical landmark, (e.g., an ostium). Moreover, the geometrical features may include a contour and/or a marker object. In this case, the spatial registration may include a determination of the transformation and/or an application of the transformation to the first and/or the second dataset in such a way that a spatial difference between the images of one of the respective anatomical and/or geometrical features in the first and second dataset is minimized.

The identification of the mapping of the at least one vessel section of the region of interest may include an identification, (e.g., a segmentation), of image points of the first dataset and of image points of the second dataset, with the image points mapping the at least one vessel section. In this case, the at least one vessel section, in particular at least one afferent, in particular supplying, vessel section as regards the region of interest and/or a part of the region of interest, may be identified with the aid of the imaged flooding of the first and/or of the second contrast medium flow of the region of interest. The flooding of the first and/or of the second contrast medium flow may describe a local gradient in a contrast medium concentration, (e.g., a predefined change in intensity), in the at least one vessel section, in particular the mapping of the at least one vessel section in the first and/or second dataset. The direction of the flooding may be determined in this case with the aid of the time-resolved mapping of the gradient in the contrast medium concentration, (e.g., the predefined change in intensity), along the image points mapping the at least one vessel section, in particular along a central line of the at least one vessel section. Provided the direction of the flooding in the at least one vessel section is directed towards the region of interest, an afferent, in particular supplying, vessel section may be identified as the at least one vessel section.

Advantageously, an image of one or more, in particular consecutive, vessel sections of a common vessel, (e.g., an artery and/or vein), may be identified with the aid of the direction of the mapped flooding of the first and/or of the second contrast medium flow.

In accordance with a first variant, the mapping of the at least one vessel section of the region of interest in the first and the second dataset may be identified with the aid of the direction of the mapped flooding of the first and of the second contrast medium flow.

In accordance with a second variant, the mapping of the at least one vessel section of the region of interest in the first and the second dataset may be identified with the aid of the direction of the mapped flooding of the first or of the second contrast medium flow. Here, the mapping of the at least one vessel section may additionally be identified in the first and the second dataset as a result of their spatial registration.

The temporal registration of the first and of the second dataset may include a synchronization of the time intensity curves of image points of the first and of the second dataset corresponding spatially to one another, in particular one image point of the first and of the second dataset in each case, based on the mapped flooding of the first and of the second contrast medium flow in the at least one vessel section. In this case, the image points of the first and second dataset corresponding spatially to one another, which are also used in particular for synchronization of the time intensity curves of the other image points of the first and of the second dataset, may map a common spatial position in the at least one vessel section. Moreover, the temporal difference of the mapped flooding of the first and of the second contrast medium flow in the at least one vessel may be determined by a comparison of points in time or by reaching or exceeding a predefined intensity threshold value of the time intensity curves of the image points of the first and second dataset corresponding spatially to one another. Advantageously, through the temporal registration of the first and of the second dataset, in particular the synchronization of the time intensity curves of image points of the first and second dataset corresponding spatially to one another, the temporal difference of the mapped flooding of the first and of the second contrast medium flow in the at least one vessel section may be minimized.

The comparison of the spatially and temporally registered first and second datasets for identification of the difference between the first and second contrast medium flow may include a comparison of the registered time intensity curves of the image points of the first and second dataset corresponding spatially to one another. The comparison described here enables the difference between the first and the second contrast medium flows to be identified. In particular, the image points of the registered first and/or second datasets may be identified, which map the difference between the first and the second contrast medium flows. Advantageously, the difference may initially be identified qualitatively by the comparison of the registered first and second datasets.

The provision of the comparison dataset may further include a quantitative comparison of the registered first and second datasets, in particular a quantitative comparison between the image points of the registered first and second datasets, with the image points mapping the difference between the first and the second contrast medium flows. The comparison dataset may have the at least one parameter characterizing the difference. In this case, the at least one parameter characterizing the difference may describe, (e.g., quantify), the difference globally, (e.g., for the entire region of interest), locally, (e.g., image point by image point), or regionally, (e.g., for at least one vessel section). The comparison dataset may further have a number of parameters characterizing the difference, which describe the difference locally or regionally. Moreover, the comparison dataset may have a 2D and/or 3D spatially-resolved comparison image of the region of interest of the examination object, wherein the image points of the comparison image map the difference between the first and the second contrast medium flows, for example, a difference or a relationship. Moreover, the comparison image may be time-resolved. In this case, image values of the image points of the comparison image may at least partly correspond to the number of parameters characterizing the difference.

The provision of the comparison dataset may include a storage on a computer-readable memory medium and/or a display of graphical representation of the comparison dataset on a display unit and/or a transmission to a provision unit. In particular, the provision of the comparison dataset may include a display of a graphical representation of the comparison dataset, in particular of the at least one parameter characterizing the difference, by a display apparatus. In addition, the provision of the comparison dataset may include an overlaid or side-by-side display of a graphical representation of the registered first and second datasets. At least one display parameter of the display apparatus may further be configured to display the graphical representations as a function of the comparison dataset, in particular, of the at least one parameter characterizing the difference, for example, by a color coding.

The embodiment may advantageously, in particular, through the provision of the comparison dataset having the at least one parameter characterizing the difference, make possible a quantitative analysis of the change in the temporal dynamic of the second contrast medium flow in relation to the first contrast medium flow in the region of interest of the examination object.

In a further advantageous embodiment, the provision of the first dataset may include a receipt of previously acquired first image data. In this case, the first dataset may be reconstructed from the first image data. Moreover, the provision of the second dataset may include a receipt of previously acquired second image data. In this case, the second dataset may be reconstructed from the second image data.

The receipt of the first and/or the second image data may include an acquisition and/or readout of a computer-readable data memory and/or a receipt from a data memory unit, for example, a database. The first and/or the second image data may further be provided by a provision unit of the one or the number of medical imaging devices, in particular the same or different imaging modalities.

The first image data may map the region of interest of the examination object within the first period of time, in particular at the number of first recording points. The first image data may map the region of interest in each case at least partly, in particular completely. The first image data may further map the region of interest with at least partly different mapping geometries, in particular mapping directions, and/or at different first recording points. The first image data may have slice images and/or projection images of the region of interest within the first period of time.

The second image data may map the region of interest of the examination object within the second period of time, in particular at the number of second recording points. It may map the region of interest in each case at least partly, in particular completely. The second image data may further map the region of interest with at least partly different mapping geometries, in particular mapping directions, and/or at different first recording points. The second image data may have slice images and/or projection images of the region of interest within the second period of time.

Advantageously, the first dataset may be reconstructed from the first image data. The second dataset may further be reconstructed from the second image data. In this case, the reconstruction of the first dataset may include a spatial and/or temporal registration of the first image data with one another. The reconstruction of the first dataset may further include a 2D or 3D reconstruction, (for example, of an inverse radon transformation, a filtered back projection, an inverse Fourier transformation, or combinations thereof), to the first image data. Similarly to this, the reconstruction of the second dataset may include a spatial and/or temporal registration of the second image data to one another. The reconstruction of the second dataset may further include an application of a 2D or 3D reconstruction, for example, of an inverse radon transformation and/or a filtered back projection and/or of an inverse Fourier transformation, to the second image data. In this case, the reconstruction of the first and of the second dataset may be the same or different. The reconstruction of the first and/or of the second dataset may further include an application of an image artifact correction, in particular a movement correction and/or metal artifact correction, to the respective image data.

The proposed embodiment may make possible an improved mapping of the first and second contrast medium flow in the region of interest of the examination object.

In a further advantageous embodiment, the first image data may have a number of first projection images of the examination object from at least partly different, in particular not collinear, first projection directions. In this case, the time-resolved first dataset may be reconstructed from the first projection images. The second image data may further have a number of second projection images of the examination object from at least partly different, in particular not collinear, second projection directions. In this case, the time-resolved second dataset may be reconstructed from the second projection images.

The at least one medical imaging device for recording the first and second image data may advantageously have a source and a detector, which are able to be positioned in a defined arrangement in relation to the examination object, in particular the region of interest. In one embodiment of the medical imaging device as a medical x-ray device, (e.g., as a medical C-arm x-ray device and/or Computed Tomography (CT) installation), the source may be an x-ray source and the detector an x-ray detector.

The at least partly different first and second projection directions may each describe the course of a ray, (e.g., of a central and/or middle ray), between the source and the detector, (e.g., a central point of the detector), of the at least one medical imaging device at the recording time of the respective image data, (e.g., at one of the first or second recording times). In particular, the first and second projection directions may each describe an angulation of the at least one medical imaging device in relation to the examination object, in particular the region of interest, and/or an isocenter, in particular center of rotation, of the defined arrangement of source and detector. In this case, the isocenter may describe a spatial point around which the defined arrangement of source and detector is able to be moved, in particular rotated, in particular during the recording of the first and second image data. Advantageously, the at least partly different first and second projection directions may each run through the in particular common isocenter. In this case, the isocenter may be positioned during the recording of the first image data the same or differently from the isocenter during the recording of the second image data relative to the examination object, in particular the region of interest.

Advantageously, the number of first and second projection images may map the region of interest of the examination object 2D spatially resolved in each case. Advantageously, the first dataset may be reconstructed from the number of first projection images in such a way that the first dataset maps the region of interest 3D spatially resolved and time resolved. Moreover, the second dataset may be reconstructed from the number of second projection images in such a way that the second dataset maps the region of interest 3D spatially resolved and time resolved. In particular, the first and the second dataset may each be reconstructed in accordance with a 4D DSA from the respective projection images.

The proposed form of embodiment may make possible an improved, in particular low-coverage, mapping of the first and second contrast medium flow in the region of interest of the examination object.

In a further advantageous embodiment, the first and/or the second image data may have at least one mask image. Moreover, the first image data may have a number of first fill images. In this case, the reconstruction of the first dataset may include a subtraction of the at least one mask image from the number of first fill images. The second image data may further have a number of second fill images. In this case, the reconstruction of the first dataset may include a subtraction of the at least one mask image from the number of second fill images.

Advantageously, the first and/or the second image data may have at least one mask image, in particular at least one mask image each. If the first image data has the at least one mask image, then the at least one mask image may map the region of interest temporally before the flooding of the first contrast medium flow, in particular the flooding of the first contrast medium flow in the at least one vessel section. If the second image data has the at least one mask image, then the at least one mask image may map the region of interest temporally before the flooding of the second contrast medium flow, in particular before the flooding of the second contrast medium flow in the at least one vessel section. The at least one mask image may further have all features and characteristics of the first and/or second image data, in particular of the first and/or second projection images. Advantageously, the first and/or second image data may have a number of mask images, in particular one mask image in each case for each mapping geometry relating to the examination object.

The first image data may have a number of first fill images. In this case, the first fill images may map the first contrast medium flow in the region of interest of the examination object in the first period of time, in particular at the number of first recording times. The number of first fill images may have all features and characteristics of the first image data, in particular of the first projection images.

The second image data may further have a number of second fill images. In this case, the second fill images may map the second contrast medium flow in the region of interest of the examination object in the second period of time, in particular at the number of second recording times. The number of second fill images may have all features and characteristics of the second image data, in particular of the second projection images.

In accordance with a first variant, the first dataset may be determined by subtraction of the at least one mask image from the number of first fill images. In particular, the first dataset may include first differential images of the subtraction of the at least one mask image from the number of first fill images. The second dataset may further be determined by subtraction of the at least one mask image from the number of second fill images. In particular, the second dataset second may include differential images of the subtraction of the at least one mask image from the number of second fill images. If only the first or only the second image data has the at least one mask image, then the at least one mask image may advantageously be registered before the respective subtraction with the first and/or second fill images, in particular spatially. As an alternative, the first and the second image data may each have at least one mask image, in particular at least one first and at least one second mask image. In this case, the first dataset may be determined by subtraction of the at least one first mask image from the number of first fill images. Moreover, the second dataset may be determined by subtraction of the at least one second mask image from the number of second fill images.

In accordance with a second variant, the first and/or the second image data may have a number of mask images, which map the region of interest with at least partly different mapping geometries, in particular projection directions. In this case, advantageously at least one mask dataset may be reconstructed from the number of mask images. The first dataset may further be determined by subtraction of the at least one mask dataset from the number of first fill images. The second dataset may further be determined by subtraction of the at least one mask dataset from the number of second fill images. If the first and the second image data each have a number of mask images, a mask dataset may be reconstructed in each case from the mask images, in particular a first and a second mask dataset. In this case, the first dataset may be determined by subtraction of the first mask dataset from the number of first fill images. Moreover, the second dataset may be determined by subtraction of the second mask dataset from the number of second fill images.

The subtraction of the at least one mask image, in particular of the at least one mask dataset, in each case from the first and the second fill images advantageously enables image areas, which map temporally and/or spatially unchangeable areas of the region of interest to be removed, in particular masked out. What may advantageously be achieved by this is that the first dataset may only map the first contrast medium flow in the first period of time. What may further be achieved by this is that the second dataset may only map the second contrast medium flow in the second period of time.

In a further advantageous embodiment, the registered first and second dataset may have a number of image points each with a time intensity curve. In this case, the identification of the difference between the first and the second contrast medium flow may include a comparison of the time intensity curves, in particular of a gradient, a variance, an average intensity value, a maximum intensity value and/or an accumulated intensity value of the time intensity curves, of image points of the registered first and second dataset corresponding spatially to one another. Moreover, the at least one parameter characterizing the difference describing a fill delay and/or a flow rate relationship may be determined with the aid of a comparison of the time intensity curves of the image points corresponding spatially to one another of the registered first and second dataset.

The comparison of the time intensity curves of the image points of the registered first and second dataset corresponding spatially to one another may be performed at one or more points in time after the beginning of the respective flooding in the first and second period of time, for example, by comparison of the intensity values of the time intensity curves at the at least one point in time. As an alternative or in addition, the comparison of the time intensity curves of the image points of the registered first and second dataset corresponding spatially to one another may be performed over a predefined period of time after the beginning of the respective flooding in the first and second period of time, for example, by comparison of the average and/or accumulated intensity values and/or a change in the intensity values of the time intensity curves in the predefined period of time. As an alternative or in addition, the comparison of the time intensity curves of the image points of the registered first and second dataset corresponding spatially to one another may be performed in a predefined range of intensity values, for example, by comparison of a duration beginning from a lower limit of the range of intensity values up to the time that an upper limit of the range of intensity values of the time intensity curves of the image points of the registered first and second dataset corresponding spatially to one another is reached or exceeded.

The gradient of the time intensity curves of the image points of the registered first and second dataset corresponding spatially to one another may map a speed of the respective flooding of the first and second contrast medium flow. The variance of the time intensity curves of the registered first and second dataset corresponding spatially to one another may further map a perfusion of the region of interest. Moreover, the average intensity value may map an in particular average volume flow of the first and second contrast medium flow. The maximum intensity value may further map an in particular maximum volume flow of the first and second contrast medium flow. Furthermore, the accumulated intensity value may map a contrast medium volume of the first and second contrast medium flow during the predefined period of time. The comparison of the gradient, the variance, the average intensity value, and/or of the accumulated intensity value of the time intensity curves of the image points of the registered first and second dataset corresponding spatially to one another advantageously enables the difference between the first and the second contrast medium flow to be identified, in particular quantified.

Advantageously, the determination of the at least one parameter characterizing the difference may include an, in particular local, regional or global, quantification of the difference through the comparison of the time intensity curves, in particular of the gradient, the variance, the average intensity value, the maximum intensity value and/or the accumulated intensity value, of the time intensity curves of the image points of the registered first and second dataset corresponding spatially to one another. In particular, the at least one parameter characterizing the difference may map a difference or a relationship of the variance, of the average intensity value, of the maximum intensity value and/or of the accumulated intensity value of the time intensity curves of the image points of the registered first and second dataset corresponding spatially to one another. Moreover, the determination of the at least one parameter characterizing the difference may include a quantification of a hemodynamic parameter, in particular a change in the hemodynamic parameter between the first and the second period of time, based on the difference of the gradient, the variance, the average intensity value, and/or the accumulated intensity value of the time intensity curves of the image points of the registered first and second dataset corresponding spatially to one another. In this case, the at least one parameter characterizing the difference may for example describe a fill delay and/or a flow rate relationship. In this case, the fill delay may describe a time difference of the lengths of time between flooding of the first and second contrast medium flow and reaching a predefined, in particular normalized, intensity value. Moreover, the flow rate relationship may describe an in particular normalized relationship of the in particular maximum or average volume flow of the first and second contrast medium flow. Advantageously, the fill delay may be determined with the aid of the comparison of the gradient and/or of the accumulated intensity value of the time intensity curves of the image points of the registered first and second dataset corresponding spatially to one another. Moreover, the flow rate relationship may be determined with the aid of the average, the maximum and/or the accumulated intensity value. In addition, the at least one parameter characterizing the difference may describe a hemodynamic pressure and/or a shear tension of the vessel wall and/or flow speeds in the at least one vessel section. For this, the at least one parameter characterizing the difference may additionally be determined based on a flow model, for example, computational fluid dynamics (CFD), and/or by determining boundary conditions with the aid of the registered first and second dataset, for example for a speed of the flooding.

The proposed form of embodiment may advantageously make possible a quantification of the different temporal dynamics of the first and second contrast medium flow by a biophysical variable, for example, the fill delay and/or the flow rate relationship.

In a further advantageous embodiment, at least one first and at least one second image point may be determined in each case in the registered first and second dataset, with the image points mapping two different spatial positions in the at least one vessel section. Further, the spatial position mapped by the at least one second image point may be assigned downstream to the spatial position mapped by the at least one first image point. In this case, a bolus arrival time (BAT) may be determined in each case as the time of the flooding of the first and second contrast medium flow at the spatial position mapped by the at least one second image point. The difference may further be identified based on the bolus arrival times of the at least one second image point and the comparison of the time intensity curves, in particular of a gradient, a variance, an average intensity value, a maximum intensity value and/or an accumulated intensity value of the time intensity curves, of the at least one first image point of the registered first and second dataset.

The at least one first and at least one second image point in the registered first and second dataset may be defined in each case manually, semi-automatically, or fully automatically. For example, the at least one first and/or the at least one second image point may be predetermined with the aid an entry by a medical operator by an input unit, in particular with the aid of a graphical representation of the registered first and/or second dataset. In particular, only the at least one first or only the at least one second image point may be predetermined with the aid of the entry by the medical operator. In this case, the other at least one image point in each case may be determined automatically, for example, with the aid an anatomy atlas and/or a segmentation of the at least one vessel section. As an alternative, both the at least one first and also the at least one second image point may be predetermined with the aid the entry by the medical operator. Furthermore, the at least one first and the at least one second image point may be determined fully automatically, for example, with the aid a segmentation of the region of interest and of the at least one vessel section in the registered first and second dataset.

The two different spatial positions may each be mapped by one or by a number of image points of the registered first and second dataset, in particular, the at least one first and the at least one second image point. The spatial position mapped by the at least one second image point may further be arranged downstream, in particular in respect of a flow direction and/or the direction of the flooding in the at least one vessel section, from the spatial position mapped by the at least one first image point. This enables the spatial position mapped by the at least one first image point to have the first and second contrast medium flowing into it at a time before the at least one second image point in each case.

Advantageously, the bolus arrival times of the first and second contrast medium flow at the spatial position mapped by the at least one second image point may be determined by a comparison of the respective time intensity curves with a predetermined intensity threshold value. A reaching or exceeding of the predetermined intensity threshold value may characterize a beginning of the flooding of the first or second contrast medium flow at the spatial position mapped by the at least one second image point. Advantageously, the bolus arrival times of the first and second contrast medium flow at the spatial position mapped by the at least one second image point may identify a point and/or section of the time intensity curves of the at least one first image point of the registered first and second dataset with the maximum gradient. Advantageously, the difference may be identified based on the comparison of the time intensity curves of the at least one first image point of the registered first and second dataset at the identified point and/or section.

The proposed embodiment may make possible a precise comparison of the temporal dynamics of the first and second contrast medium flow.

In a further advantageous embodiment, at least one first and at least one second image point may be determined in each case in the registered first and second dataset, with the image points mapping two different spatial positions in the at least one vessel section. In this case, the identification of the difference between the first and the second contrast medium flow may include a determination of a first relationship between the time intensity curves, in particular a gradient, a variance, an average intensity value, a maximum intensity value and/or an accumulated intensity value of the time intensity curves, of the at least one first image point in the registered first and second dataset. The identification of the difference may further include a determination of a second relationship between the time intensity curves, (e.g., a gradient, a variance, an average intensity value, a maximum intensity value, and/or an accumulated intensity value of the time intensity curves), of the at least one second image point in the registered first and second dataset. Moreover, the identification of the difference may include a determination of a third relationship between the first and the second relationship, wherein the difference is identified with the aid of the third relationship.

Because of the different spatial arrangement of the two different spatial positions along the at least one vessel section, a point in time of the flooding of the first and second contrast medium flow at the two different spatial positions may be distinguished. In particular, the spatial position mapped by the at least one first image point may be flooded by the first and second contrast medium flow temporally before the spatial position mapped by the at least one second image point in each case.

The determination of the first relationship between the time intensity curves of the at least one first image point in the registered first and second dataset may include a determination of a first quotient or a first difference between the time intensity curve of the at least one first image point in the registered first dataset and the time intensity curve of the at least one first image point in the registered second dataset. Thus, the first relationship may map a difference between the first and the second contrast medium flow at the spatial position mapped by the at least one first image point.

Moreover the determination of the second relationship between the time intensity curves of the at least one second image point in the registered first and second dataset may include a determination of a second quotient or a second difference between the time intensity curve of the at least one second image point in the registered first dataset and the time intensity curve of the at least one second image point in the registered second dataset. Thus the second relationship may map a difference between the first and the second contrast medium flow at the spatial position mapped by the at least one second image point.

The determination of the third relationship may include a determination of a quotient or a difference between the first and the second relationship, in particular between the first and the second quotients or between the first and the second differences. In this case, the third relationship, in addition to the respective difference between the first and second contrast medium flow at the spatial positions mapped by the at least one first and the at least one second image point, may map a spatial difference of the first and second contrast medium flow between the two different spatial positions.

The proposed form of embodiment may advantageously make possible a spatio-temporal comparison between the first and the second contrast medium flow.

In a further advantageous embodiment, the region of interest may have an in particular arteriovenous and/or venous and/or capillary vessel malformation and/or a stenosis and/or an aneurysm. In this case, the at least one vessel section may be afferent, in particular leading towards, and/or efferent, in particular leading away from, the vessel malformation and/or the stenosis and/or the aneurysm. In this case, the at least one first image point may map a spatial position within or proximal in relation to, and the at least one second image point a spatial position distal in relation to, the vessel malformation and/or the stenosis and/or the aneurysm. As an alternative, the at least one first image point may map a spatial position proximal in relation to, and the at least one second image point a spatial position distal in relation to, the vessel malformation and/or the stenosis and/or the aneurysm in each case.

A spatial position proximal in relation to the vessel malformation and/or the stenosis and/or the aneurysm may refer to a spatial position in the at least one vessel section, which is flooded temporally before the vessel malformation and/or the stenosis and/or the aneurysm by the first and second contrast medium flow. In particular, the proximal spatial position may be arranged in an afferent part of the at least one vessel section. In this case, the spatial position arranged proximally in relation to the vessel malformation and/or the stenosis and/or the aneurysm may be arranged in the at least one vessel section in the immediate vicinity of the vessel malformation and/or the stenosis and/or the aneurysm, in particular may adjoin it, or may be arranged spatially distanced from the vessel malformation and/or the stenosis and/or the aneurysm.

A spatial position distal in relation to the vessel malformation and/or the stenosis and/or the aneurysm may further refer to a spatial position in at least one vessel section, which is flooded temporally after the vessel malformation and/or the stenosis and/or the aneurysm by the first and second contrast medium flow. In particular, the distal spatial position may be arranged in an efferent part of the at least one vessel section. In this case, the spatial position arranged distally in relation to the vessel malformation and/or the stenosis and/or the aneurysm may be arranged in the at least one vessel section in the in particular immediate vicinity of the vessel malformation and/or the stenosis and/or the aneurysm, in particular may adjoin it, or may be arranged spatially distanced from the vessel malformation and/or the stenosis and/or the aneurysm.

Advantageously, the two different spatial positions, which may be arranged proximal to, distal to or within the vessel malformation and/or the stenosis and/or the aneurysm, are connected hemodynamically via the at least one vessel section.

Because of the different spatial arrangement of the two different spatial positions in the at least one vessel section, a point in time of the flooding of the first and second contrast medium flow at the two different spatial positions may be distinguished. In particular, the spatial position mapped by the at least one first image point may be flooded temporally by the first and second contrast medium flow before the spatial position mapped by the at least one second image point.

Advantageously, between the first and the second period of time, in particular before the beginning of the method an in particular therapeutic and/or surgical and/or interventional change to the vessel malformation, the stenosis and/or the aneurysm may have taken place. As a result of this, there may have been a change in a flow dynamic, in particular at least of at least one hemodynamic parameter within or distal in relation to the vessel malformation and/or the stenosis and/or the aneurysm. Advantageously the changed flow dynamic, in particular adjusted for the injection dynamic, may be mapped by the third relationship.

The proposed form of embodiment may advantageously make possible a quantitative comparison of the first and second contrast medium flow for evaluation of the change to the vessel malformation, the stenosis and/or the aneurysm.

In a further advantageous embodiment, an injection parameter of the first and of the second contrast medium flows may be received in each case. The time intensity curves may further be normalized based on the injection parameters. In this case, the identification of the difference between the first and second contrast medium flows may include a comparison with the normalized time intensity curves of image points of the registered first and second datasets corresponding spatially to one another.

The receipt of the injection parameters of the first and second contrast medium flows may include an acquisition from and/or a readout of a computer-readable data memory and/or a receipt from a data storage unit, for example, a database. The injection parameters may further be provided by a provision unit of an injection apparatus, in particular of an automatic injection system. As an alternative or in addition, the injection parameters may be received with the aid of a further entry by the medical operator by the input unit.

The injection parameters of the first and of the second contrast medium flows may in each case describe an injection rate, (e.g., a volume flow), an injection pressure, a contrast medium concentration, an injection time, a spatial catheter position, or combinations thereof. The normalization of the time intensity curves based on the injection parameters enables the difference between the first and second contrast medium flows to be identified adjusted for the injection dynamics of the first and second contrast medium flows.

In a second aspect, the disclosure relates to a provision unit configured to carry out a proposed method for provision of a comparison dataset.

The advantages of the proposed provision unit correspond with the advantages of the proposed method for provision of a comparison dataset. Features, advantages, or alternate forms of embodiment mentioned here may likewise be transferred to other claimed subject matter and vice versa.

Advantageously, the provision unit may include a computing unit, a memory unit, and/or an interface. The provision unit, (e.g., the components of the provision unit), may be embodied for carrying out the individual acts of the proposed method for provision of a comparison dataset. In particular, the interface may be embodied for provision of the time-resolved first and second dataset and for provision of the comparison dataset. The computing unit and/or the memory unit may further be embodied for spatial and temporal registration of the first and second dataset, and also for identification of the difference between the first and second contrast medium flow.

In a third aspect, the disclosure relates to a medical imaging device having a proposed provision unit, wherein the medical imaging device is embodied for recording and/or for provision of the first and second dataset.

The medical imaging device may be embodied as a Magnetic Resonance Tomography (MRT) installation and/or Computed Tomography (CT) installation and/or medical x-ray device and/or Positron Emission Tomography (PET) installation and/or ultrasound device. The medical imaging device may further be embodied to record the first and the second dataset of the examination object including the region of interest. As an alternative, the medical imaging device may be embodied to record the first and the second image data, (e.g., the first and second projection images), of the examination object including the region of interest. In this case, the medical imaging device may further be embodied to reconstruct and provide the first dataset from the first image data. The medical imaging device may further be embodied to reconstruct and provide the second dataset from the second image data.

The advantages of the proposed medical imaging device correspond to the advantages of the proposed method for provision of a comparison dataset and/or of the proposed provision unit. Features, advantages, or alternate forms of embodiment mentioned here may likewise be transferred to other claimed subject matter and vice versa.

In a fourth aspect, the disclosure relates to a computer program product with a computer program, which is able to be loaded directly into a memory of a provision unit, with program sections for carrying out all acts of the method for provision of a comparison dataset when the program sections are executed by the provision unit.

The disclosure may further relate to a computer-readable memory medium, on which program sections able to be read and executed by a provision unit are stored for carrying out all acts of the method for provision of a comparison dataset when the program sections are executed by the provision unit.

A largely software-based realization has the advantage that even provision units and/or training units already currently in use may be upgraded in a simple manner by a software update in order to work in the ways described herein. Such a computer program product, as well as the computer program, may include additional elements such as documentation and/or additional components, as well as hardware components such as hardware keys (e.g., dongles, etc.) for use of the software.

BRIEF DESCRIPTION OF THE DRAWINGS

Exemplary embodiments of the disclosure are shown in the drawings and are described below in further detail. The same reference characters are used in different figures for the same features. In the figures.

DETAILED DESCRIPTION

Figure 1:
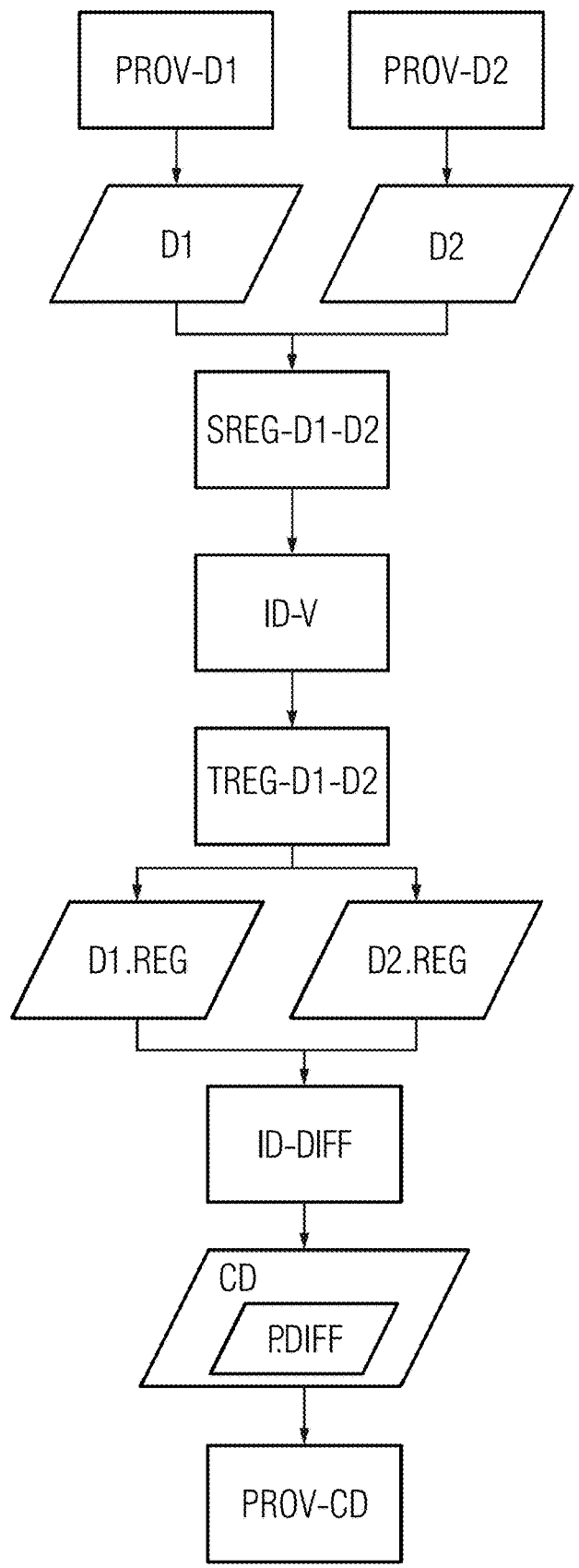
FIG. 1 depicts a schematic diagram of an advantageous form of embodiment of a proposed method for provision of a comparison dataset.

Shown schematically in FIG. 1 is an advantageous form of embodiment of a proposed method for provision PROV-CD of a comparison dataset CD. In this case, a time-resolved first dataset D1 may be provided PROV-D1, which maps a first contrast medium flow in a region of interest of an examination object in a first period of time. A time-resolved second dataset D2 may further be provided PROV-D2, which maps a second contrast medium flow in the region of interest of the examination object in a second period of time after the first period of time. Moreover, the first dataset D1 and the second dataset D2 may be registered spatially to one another SREG-D1-D2. Furthermore a mapping of at least one, in particular afferent, vessel section of the region of interest in the first D1 and the second dataset D2 with the aid of a direction of a mapped flooding of the first and/or of the second contrast medium flow may be identified ID-V. The first D1 and the second dataset D2, for minimizing a temporal difference of the mapped flooding of the first and second contrast medium flow, may be temporally registered TREG-D1-D2 in the at least one vessel section. Moreover, a difference ID-DIFF between the first and the second contrast medium flow may be identified by a comparison of the registered first D1.REG and second dataset D2.REG. The comparison dataset CD may further be provided PROV-CD based on the registered first D1.REG and second dataset D2.REG, wherein the comparison dataset CD has at least one parameter P.DIFF characterizing the difference.

Figure 2:
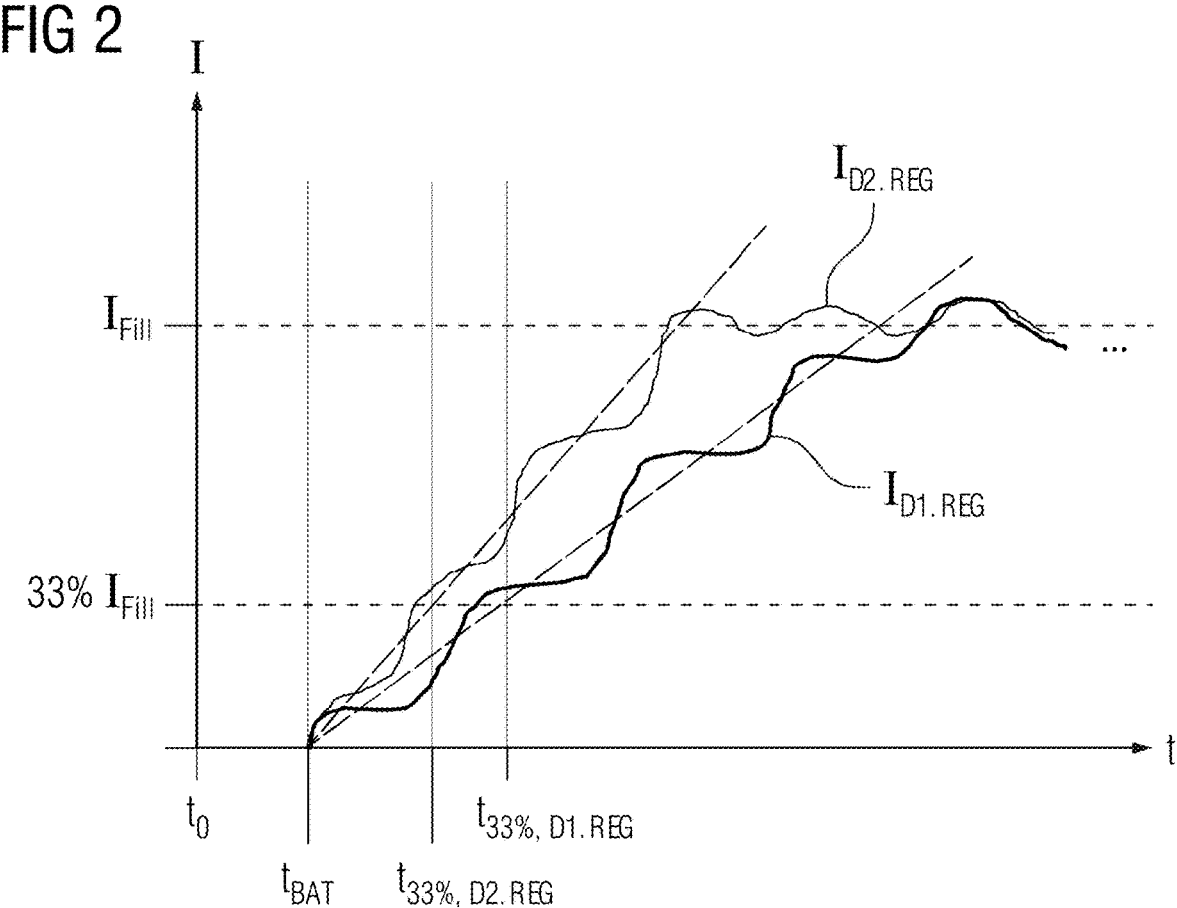
FIG. 2 depicts a schematic diagram of time intensity curves of the registered first and second dataset spatially corresponding to one another, according to an embodiment.

FIG. 2 shows a schematic diagram of time intensity curves of the registered first dataset D1.REG and second dataset D2.REG corresponding spatially to one another. Advantageously, the registered first dataset D1.REG and the registered second dataset D2.REG may have a number of image points each with a time intensity curve $I_{D1.REG}$ and $I_{D2.REG}$. In this case, the identification of the difference ID-DIFF between the first and the second contrast medium flow may include a comparison of the time intensity curves $I_{D1.REG}$ and $I_{D2.REG}$, in particular of a gradient, a variance, an average intensity value, a maximum intensity value, and/or an accumulated intensity value of the time intensity curves $I_{D1.REG}$ and $I_{D2.REG}$, of image points of the registered first dataset D1.REG and of the registered second dataset D2.REG corresponding spatially to one another. Moreover, the at least one parameter P.DIFF characterizing the difference describing a filling delay and/or a flow rate relationship may be determined with the aid of the comparison of the image points of the time intensity curves $I_{D1.REG}$ and $I_{D2.REG}$ of the registered first dataset D1.REG and of the registered second dataset D2.REG corresponding spatially to one another.

Through the spatial and temporal registration of the first D1.REG and second dataset D2.REG the time intensity curves $I_{D1.REG}$ and $I_{D2.REG}$ corresponding spatially to one another may be registered temporally in relation to a respective mapped flooding of the first and second contrast medium flow, in particular a bolus arrival time $t_{BAT}$. Advantageously, the time intensity curves $I_{D1.REG}$ and $I_{D2.REG}$ corresponding spatially to one another may be compared in order to determine the parameter P.DIFF characterizing the difference. For this, for example, a temporal difference between the bolus arrival time $t_{BAT}$ and a time until a predetermined intensity threshold value of the time intensity curves $I_{D1.REG}$ and $I_{D2.REG}$ is reached or exceeded may be determined. An intensity value of 33% of the maximum intensity value, in particular of a filling intensity value $I_{Fill}$, may be predetermined for the intensity threshold value, for example. In this case, the temporal difference between the bolus arrival time $t_{BAT}$ and the respective time $t_{33\%,D1.REG}$, $t_{33\%,D2.REG}$ until a predetermined intensity threshold value is reached or exceeded, in particular 33% $I_{Fill}$, may be determined. As an alternative, a temporal difference between the bolus arrival time $t_{BAT}$ and a time until a predetermined surface threshold value is reached or exceeded of a surface below the time intensity curve, (e.g., 5% of a surface below the time intensity curve beginning with the bolus arrival time $t_{BAT}$), may be determined. By a comparison of the temporal differences ($t_{33\%,D1.REG} - t_{BAT}$) and ($t_{33\%,D2.REG} - t_{BAT}$), a change in a filling rate of the at least one vessel section between the first and the second period of time may be identified.

Figure 3:
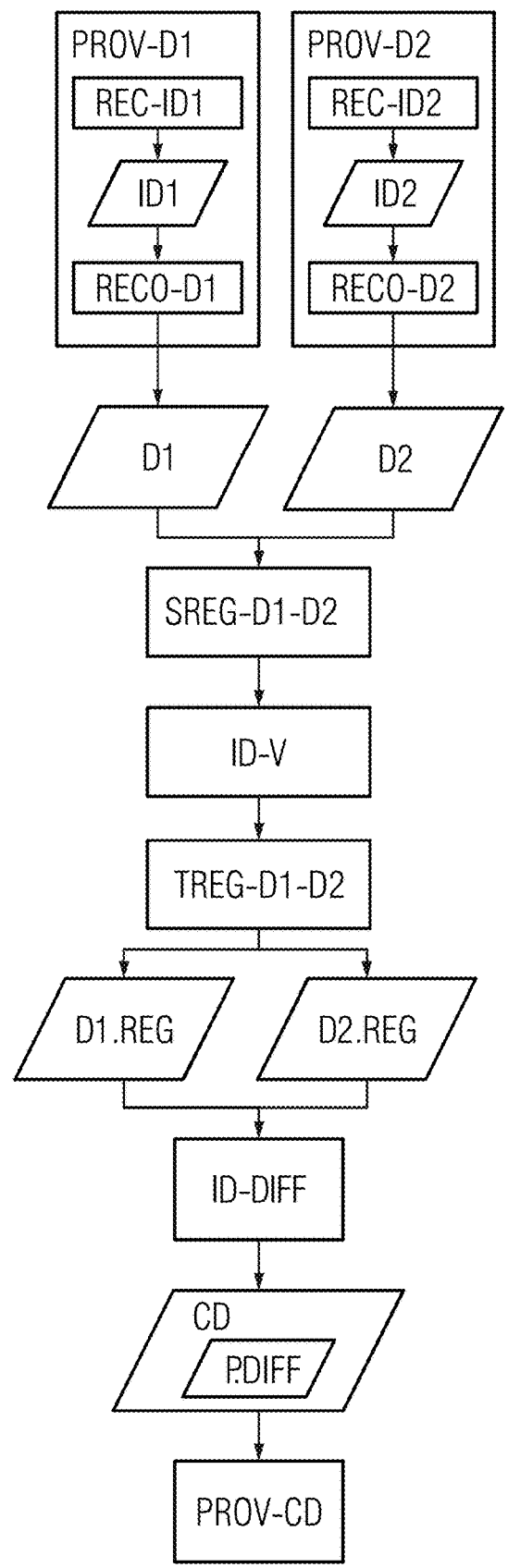
FIGS. 3 to 5 depict schematic diagrams of further advantageous forms of embodiments of the proposed method for provision of a comparison dataset.

FIG. 3 shows a schematic diagram of a further advantageous form of embodiment of a proposed method for provision PROV-CD of a comparison dataset CD. In this case, the provision PROV-D1 of the first dataset D1 may include a receipt REC-ID1 of previously acquired image data ID1. Moreover, the first dataset D1 may be reconstructed RECO-D1 from the first image data ID1. Furthermore, the provision PROV-D2 of the second dataset D2 may include a receipt REC-ID2 of previously acquired second image data D2. In this case, the second dataset D2 may be reconstructed RECO-D2 from the second image data ID2.

Advantageously, the first image data ID1 may have a number of first projection images of the examination object from at least partly different first projection directions. In this case, the time-resolved first dataset D1 may be reconstructed RECO-D1 from the first projection images. The second image data ID2 may further have a number of second projection images of the examination object from at least partly different second projection directions. In this case, the time-resolved second dataset D2 may be reconstructed RECO-D2 from the second projection images.

Figure 4:
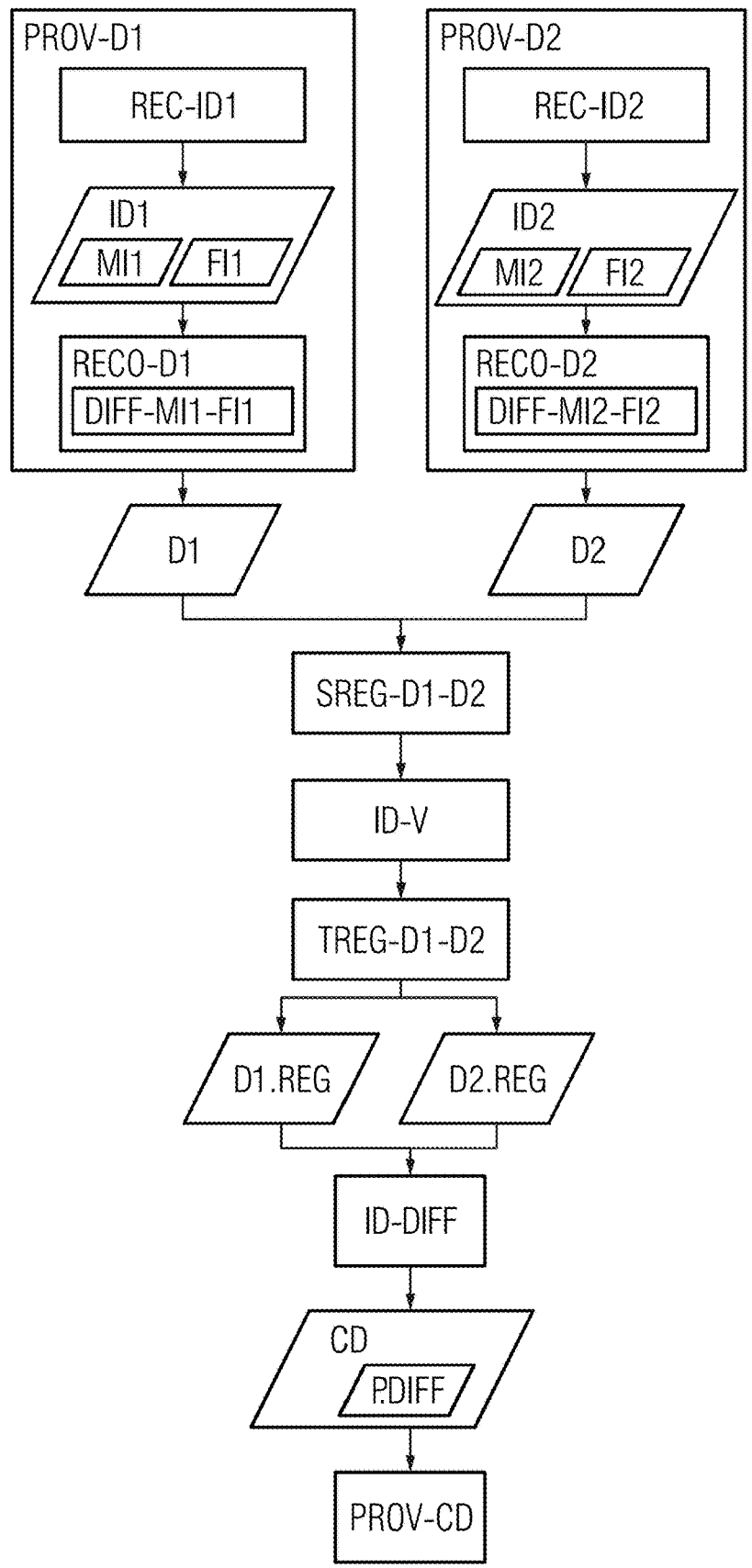

Shown schematically in FIG. 4 is a further advantageous form of embodiment of a proposed method for provision PROV-CD of a comparison dataset CD. In this case, the first ID1 and/or the second image data ID2 may have at least one mask image, in particular one mask image MI1 and MI2 in each case. The first image data ID1 may further have a number of first fill images FI1. In this case, the reconstruction RECO-D1 of the first dataset D1 may include a subtraction DIFF-MI1-FI1 of the at least one mask image MI1 from the number of first fill images FI1. The second image data ID2 may further have a number of second fill images FI2. In this case, the reconstruction RECO-ID2 of the second dataset D2 may include a subtraction DIFF-MI2-FI2 of the at least one mask image MI2 from the number of second fill images FI2.

Figure 5:
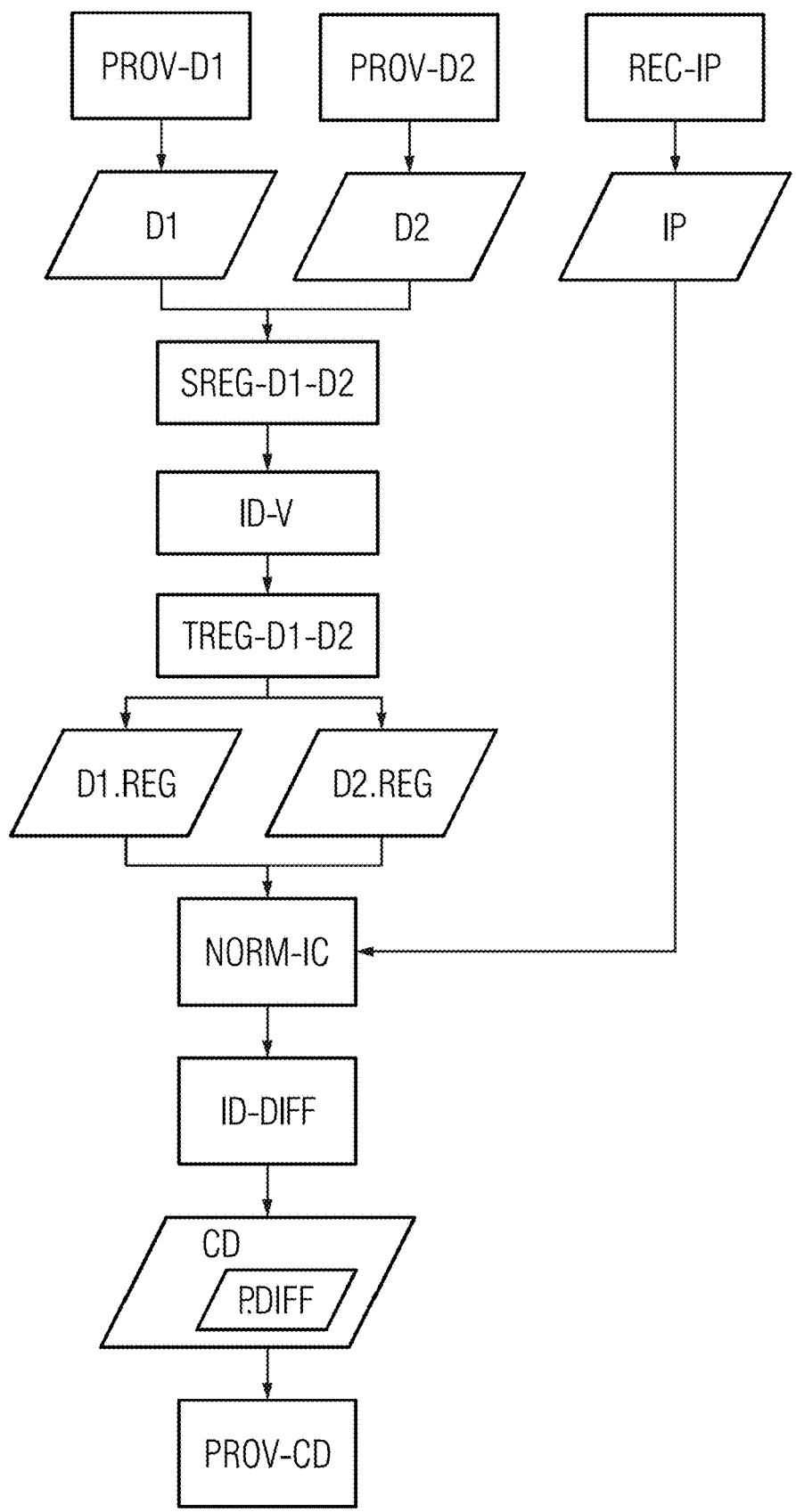

FIG. 5 shows a schematic diagram of a further advantageous form of embodiment of a proposed method for provision PROV-CD of a comparison dataset CD. In this case an injection parameter IP of the first and of the second contrast medium flow may be received REC-IP. The time intensity curves may further be normalized based on the injection parameters IP. Moreover, the identification of the difference ID-DIFF between the first and second contrast medium flow may include a comparison of the normalized time intensity curves of the image points of the registered first dataset D1.REG and of the registered second dataset D2.REG corresponding spatially to one another.

Figure 6:
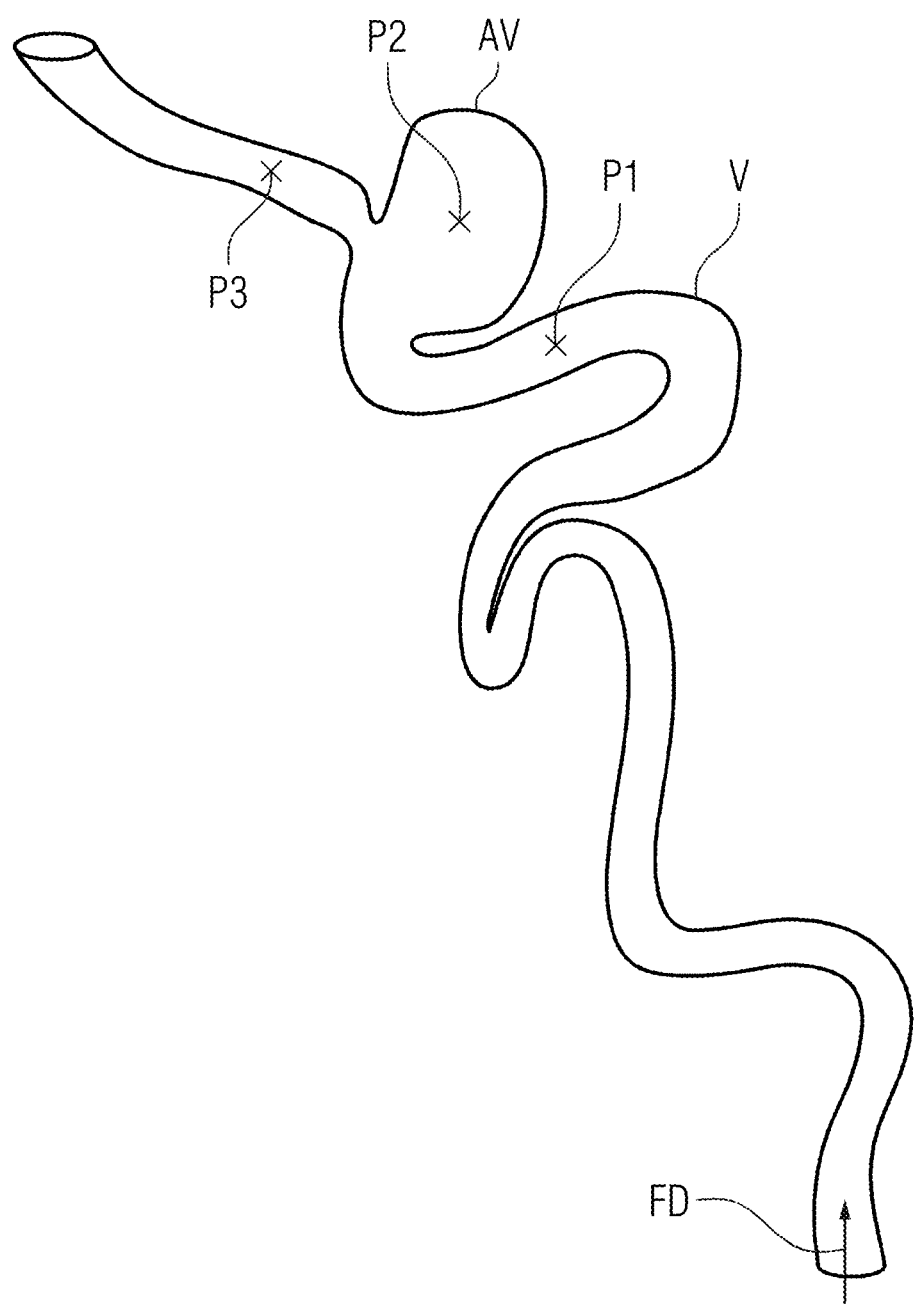
FIG. 6 depicts a schematic diagram of a region of interest having an aneurysm and at least one vessel section, according to an embodiment.

Shown schematically in FIG. 6 is an example of a region of interest having an aneurysm AV and the at least one vessel section V. The at least one vessel section V may be afferent, in particular supplying, and/or efferent, in particular discharging, to/from the aneurysm AV. In this case, a direction of flow FD, in particular a direction of the flooding of the first and second contrast medium flow, in the at least one vessel section V is illustrated in FIG. 6 by an arrow.

Advantageously, in each case, at least one first and at least one second image point may be defined in the registered first D1.REG and the registered second dataset D2.REG, with the image points mapping two different spatial positions in the at least one vessel section V. In this case, the at least one first image point may map a spatial position within P2 or proximal P1 and the at least one second image point a spatial position distal P3 in relation to the aneurysm AV in each case. As an alternative, the at least one first image point may map a spatial position proximal P1 and the at least one second image point a spatial position within P2 in relation to the aneurysm AV in each case. The three different spatial positions P1, P2, and P3 will also be referred to below as first spatial position P1, second spatial position P2, and third spatial position P3.

Advantageously, the identification of the difference ID-DIFF between the first and the second contrast medium flow may include a determination of a first relationship between the time intensity curves, in particular a gradient, a variance, an average intensity value, a maximum intensity value, and/or an accumulated intensity value of the time intensity curves, of the at least one first image point in the registered first D1.REG and second dataset D2.REG. Moreover, the identification of the difference ID-DIFF may include a determination of a second relationship between the time intensity curves, in particular a gradient, a variance, an average intensity value, a maximum intensity value, and/or an accumulated intensity value of the time intensity curves, of the at least one second image point in the registered first D1.REG and second dataset D2.REG. Furthermore, a third relationship between the first and the second relationship may be determined, wherein the difference is identified ID-DIFF with the aid of the third relationship.

Figure 7:
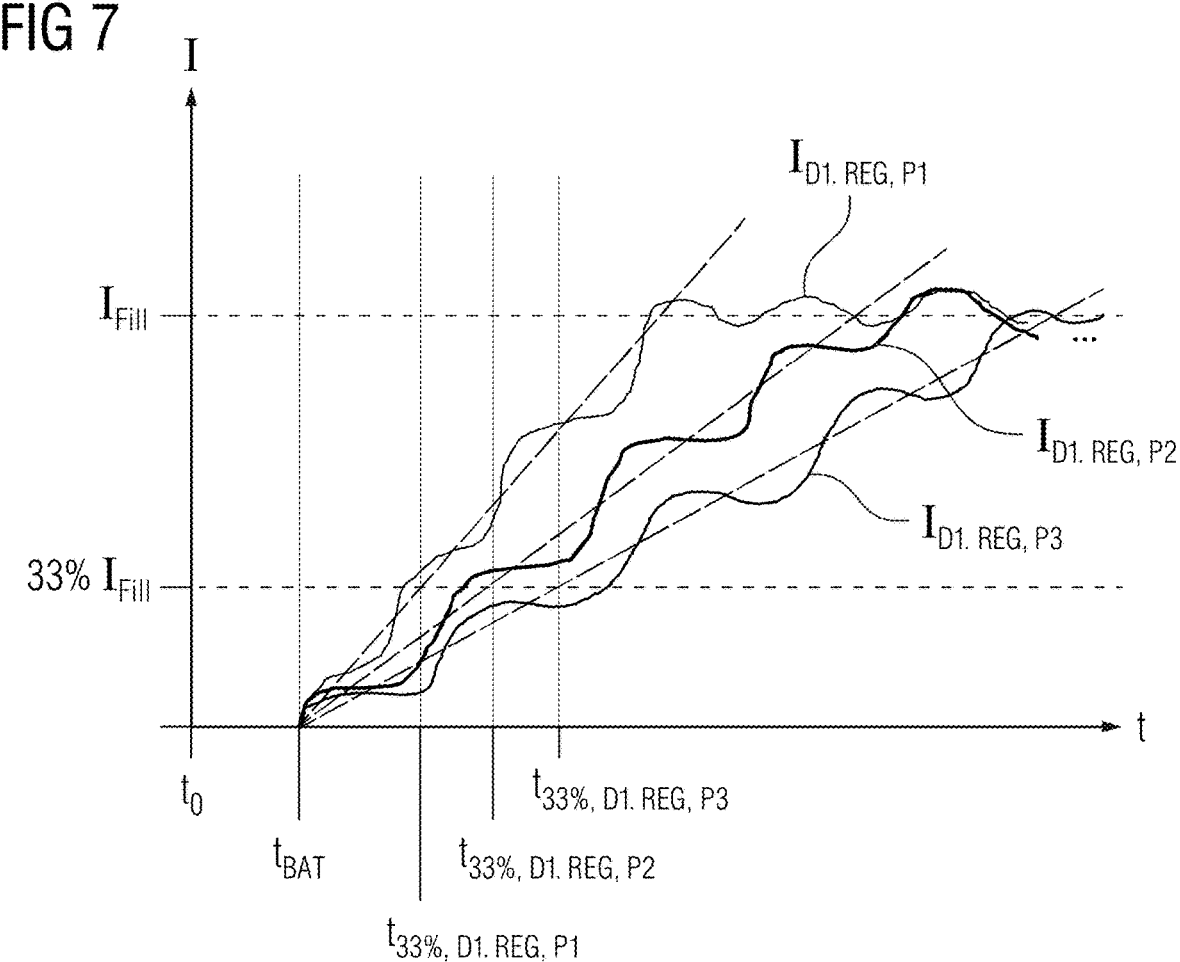
FIGS. 7 and 8 depict schematic diagrams of time intensity curves of different spatial positions along a vessel section, according to embodiments.

Mapped schematically in FIG. 7 are the time intensity curves $I_{D1.REG,P1}$, $I_{D1.REG,P2}$ and $I_{D1.REG,P3}$ of the image points of the registered first dataset D1.REG, with the image points mapping the different spatial positions P1, P2, and P3 in the at least one vessel section V shown in FIG. 6. The comparisons and/or analyses described below of the time intensity curves $I_{D1.REG,P1}$, $I_{D1.REG,P2}$ and $I_{D1.REG,P3}$ of the image points of the registered first dataset D1.REG are similarly able to be transferred to the time intensity curves $I_{D2.REG,P1}$, $I_{D2.REG,P2}$ and $I_{D1.REG,P3}$ of the image points of the registered second dataset D2.REG (not shown here).

Advantageously, the time intensity curves $I_{D1.REG,P1}$, $I_{D1.REG,P2}$ and $I_{D1.REG,P3}$ may be registered temporally with regard to the flooding of the first contrast medium flow, in particular the bolus arrival time $t_{BAT}$ in each case.

For the determination of the first and of the second relationship, the temporal difference between the bolus arrival time $t_{BAT}$ and a time until a predetermined intensity threshold value of the respective time intensity curves is reached or exceeded may be determined. An intensity value of 33% of the maximum intensity value, in particular of the filling intensity value $I_{Fill}$, may be predetermined for the intensity threshold value for example.

For example, the at least one first image point may map the spatial position proximal P1 and the at least one second image point the spatial position distal P3 in relation to the aneurysm AV in each case. In this case, the first relationship may be determined as the temporal difference between the bolus arrival time $t_{BAT}$ and the respective time $t_{33\%,D1.REG,P1}$, $t_{33\%,D2.REG,P1}$ until the predetermined intensity threshold is reach or exceeded, in particular 33% $I_{Fill}$, of the time intensity curves $I_{D1.REG,P1}$ and $I_{D2.REG,P1}$ of the at least one first image point:

$$R_{P1}=(t_{33\%,D2.REG,P1}-t_{33\%,D1.REG,P1}) \quad (1).$$

The second relationship may further be determined as the temporal difference between the bolus arrival time $t_{BAT}$ and the respective time $t_{33\%,D1.REG,P3}$, $t_{33\%,D2.REG,P3}$ until the predetermined intensity threshold is reach or exceeded, in particular 33% Inn, of the time intensity curves $I_{D1.REG,P3}$ and $I_{D2.REG,P3}$ of the at least one second image point:

$$R_{P3}=(t_{33\%,D2.REG,P3}-t_{33\%,D1.REG,P3}) \quad (2).$$

Furthermore, the third relationship $DR_{P3,P1}$ may be determined as the difference between the second $R_{P3}$ and the first relationship $R_{P1}$:

$$DR_{P3,P1}=R_{P3}-R_{P1}=(t_{33\%,D2.REG,P3}-t_{33\%,D1.REG,P3})- (t_{33\%,D2.REG,P1}-t_{33\%,D1.REG,P1}) \quad (3)$$

In this case, the third relationship $DR_{P3,P1}$ may describe the changed filling delay between the first and the second period of time of the third spatial position P3 in relation to the first spatial position P1. The at least one parameter P.DIFF characterizing the difference may include the third relationship $DR_{P3,P1}$.

As an alternative, the at least one first image point may map the spatial position within P2 and the at least one second image point the spatial position distal P3, in relation to the aneurysm AV in each case. In this case, the computation of the first relationship $RP_{P2}$ may be configured accordingly to the second spatial position P2 mapped by the at least one first image point. The third relationship $DR_{P3,P2}$ may further describe the filling delay changed between the first and the second period of time at the third spatial position P3 in relation to the second spatial position P2:

$$DR_{P3,P2}=(R_{P3}-R_{P2})=(t_{33\%,D2.REG,P3}-t_{33\%,D1.REG,P3})- (t_{33\%,D2.REG,P2}-t_{33\%,D1.REG,P2}) \quad (4).$$

Figure 8:
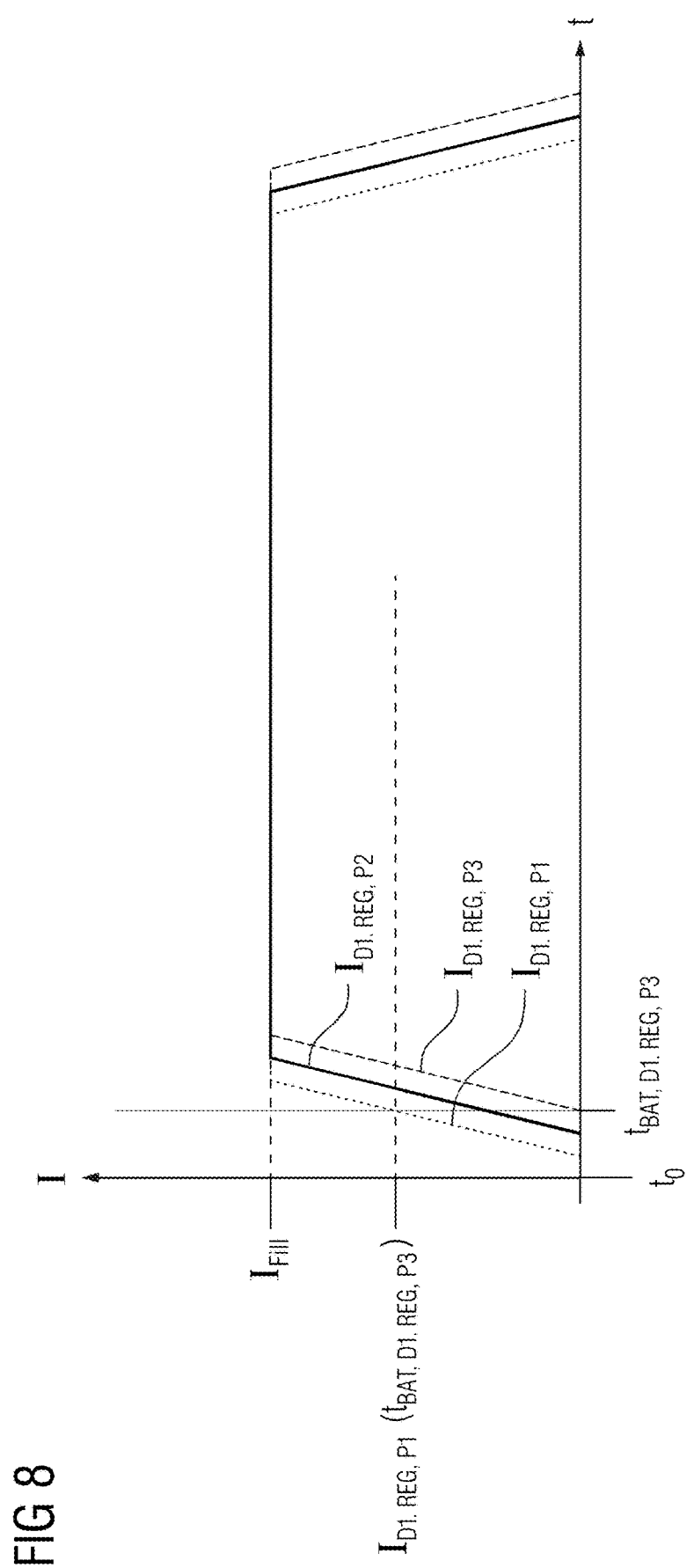

FIG. 8 shows a schematic diagram of the time intensity curves $I_{D1.REG,P1}$, $I_{D1.REG,P2}$ and $I_{D1.REG,P3}$ of the image points of the registered first dataset D1.REG, with the image points mapping the different spatial positions P1, P2, and P3 in the at least one vessel section V shown in FIG. 6. In this case the time intensity curves $I_{D1.REG,P1}$, $I_{D1.REG,P2}$ and $I_{D1.REG,P3}$ are only shown with the same gradient for purposes of illustration. The time intensity curves $I_{D1.REG,P1}$, $I_{D1.REG,P2}$ and $I_{D1.REG,P3}$ are further not registered temporally with one another in this form of embodiment.

To determine relative flow changes between a first spatial position of interest IP1, in particular the first P1 and/or the second spatial position P2, and a first reference position RP1 arranged downstream in the at least one vessel section V in relation to the first position of interest IP1, in particular the third spatial position P3, Fick's principle in particular a conservation of mass, may be applied:

$$Q_{IP1}(T) = V_{IP1} \int_0^T [C_{IP1}(t) - C_{RP1}(t)]dt \quad (5)$$

$$\left[\frac{dQ_{IP1}(t)}{dt}\right]_{t=T} = V_{IP1} \cdot [C_{IP1}(t) - C_{RP1}(t)]_{t=T} \quad (6)$$

In this case, $Q_{IP1}$ may refer to an accumulated mass of the contrast medium, $V_{IP1}$ to a volume flow, $C_{IP1}$ and $C_{RP1}$ to a contrast medium concentration at the respective spatial position IP1 or RP1.

A speed of the accumulation of the contrast medium may reach a local maximum when a difference between the contrast medium concentration at the first spatial position of interest IP1 and the first spatial reference position RP1 is at a maximum. This local maximum may be reached at a time of the flooding of the first and/or second contrast medium flow at the downstream first reference position RP1, in particular a bolus arrival time $t_{BAT.RP1}$ at the first spatial reference position RP1.

Thus the result of equation (6) is:

$$\left[\frac{dQ_{IP1}(t)}{dt}\right]_{t=t_{BAT,RP1}} = V_{IP1} \cdot C_{IP1}(t_{BAT,RP1}), \quad (7)$$

$$\frac{\left[\frac{dQ_{IP1}(t)}{dt}\right]_{t_{BAT,RP1}}}{C_{IP1}(t_{BAT,RP1})} = V_{IP1}. \quad (8)$$

Because $C_{IP1} \propto I_{IP1}$, it follows that:

$$C_{IP1}(t_{BAT,RP1}) = k \cdot I_{IP1}(t_{BAT,RP1}) \quad (9).$$

From equation (8) and (9) it follows that:

$$\frac{\left[\frac{dQ_{IP1}(t)}{dt}\right]_{t_{BAT,RP1}}}{I_{IP1}(t_{BAT,RP1})} = V_{rel,IP1}, \quad (10)$$

wherein $V_{rel,IP1} = k \cdot V_{IP1}$.

Further it follows from equation (7) and (9) that:

$$\left[\frac{dQ_{IP1}(t)}{dt}\right]_{t_{BAT,RP1}} \propto \left[\frac{dI_{IP1}(t)}{dt}\right]_{t_{BAT,RP1}}. \quad (11)$$

A relationship between the relative volume flows, which are mapped in the registered first D1.REG and second dataset D2.REG, is produced in accordance with equation (10):

$$\frac{\left[\frac{dQ_{D2.REG,IP1}(t)}{dt}\right]_{t_{BAT,D2.REG,RP1}}}{\left[\frac{dQ_{D1.REG,IP1}(t)}{dt}\right]_{t_{BAT,D1.REG,RP1}}} \cdot \frac{I_{D1.REG,IP1}(t_{BAT,D1.REG,RP1})}{I_{D2.REG,IP1}(t_{BAT,D2.REG,RP1})} = \quad (12)$$

$$\frac{V_{D2.REG,IP1}}{V_{D1.REG,IP1}}.$$

In this case, $$\frac{V_{D2.REG,IP1}}{V_{D1.REG,IP1}}$$

describes a relationship of the volume flow rates at the first position of interest IP1 in the at least one vessel section V in the first and second period of time.

Assuming that the injection parameters of the first and second contrast medium flow are constant, and a vascular volume remain the same in the at least one vessel section between the first and second period of time, it may be assumed that:

$$\frac{I_{D1.REG,IP1}(t_{BAT,D1.REG,RP1})}{I_{D2.REG,IP1}(t_{BAT,D2.REG,RP1})} \approx 1. \quad (13)$$

From the equations (11) to (13) it follows that:

$$\frac{V_{D2.REG,IP1}}{V_{D1.REG,IP1}} = \frac{\left(\frac{dI_{D2.REG,IP1}}{dt}\right)_{t_{BAT,D2.REG,RP1}}}{\left(\frac{dI_{D1.REG,IP1}}{dt}\right)_{t_{BAT,D1.REG,RP1}}}. \quad (14)$$

By a comparison of the relative volume flow rate $$\frac{V_{D2.REG,IP1}}{V_{D1.REG,IP2}}$$

for the first spatial position of interest IP1 with a relative volume flow rate $$\frac{V_{D2.REG,IP2}}{V_{D1.REG,IP2}}$$

of a second spatial position of interest IP2, a flow rate $FR_{IP1,IP2}$ may be determined by equation (15):

$$FR_{IP1,IP2} = \frac{\left[\frac{V_{D2.REG,IP1}}{V_{D1.REG,IP1}}\right]}{\left[\frac{V_{D2.REG,IP2}}{V_{D1.REG,IP2}}\right]} = \frac{\left[\frac{\left(\frac{dI_{D2.REG,IP1}}{dt}\right)_{t_{BAT,D2.REG,RP1}}}{\left(\frac{dI_{D1.REG,IP1}}{dt}\right)_{t_{BAT,D1.REG,RP1}}}\right]}{\left[\frac{\left(\frac{dI_{D2.REG,IP2}}{dt}\right)_{t_{BAT,D2.REG,RP2}}}{\left(\frac{dI_{D1.REG,IP2}}{dt}\right)_{t_{BAT,D1.REG,RP2}}}\right]}. \quad (15)$$

In this case, the second spatial position of interest IP2 may refer to a further spatial position in the at least one vessel section V, which is different from the first spatial position of interest IP1. The second spatial reference position RP2 may be arranged downstream of the second spatial position of interest IP2 in the at least one vessel section V. In particular, the first RP1 and the second reference position RP2 may be the same or different.

For the second spatial position P2 as the first position of interest IP1, the third spatial position P3 as the first reference position RP1 and as the second position of interest IP2, a relative flow rate $FR_{P2,P3}$ is produced:

$$\begin{bmatrix} \begin{bmatrix} V_{D2.REG,P2} \\ V_{D1.REG,P2} \end{bmatrix} \\ \begin{bmatrix} V_{D2.REG,P3} \\ V_{D1.REG,P3} \end{bmatrix} \end{bmatrix} = \begin{bmatrix} \begin{bmatrix} \left(\frac{dI_{D2.REG,P2}}{dt}\right)_{t_{BAT,D2.REG,P3}} \\ \left(\frac{dI_{D1.REG,P2}}{dt}\right)_{t_{BAT,D1.REG,P3}} \end{bmatrix} \\ \begin{bmatrix} \left(\frac{dI_{D2.REG,P3}}{dt}\right)_{t_{BAT,D2.REG,RP2}} \\ \left(\frac{dI_{D1.REG,P3}}{dt}\right)_{t_{BAT,D1.REG,RP2}} \end{bmatrix} \end{bmatrix}, \quad (16)$$

wherein RP2 is arranged downstream from third spatial position P3.

Figure 9:
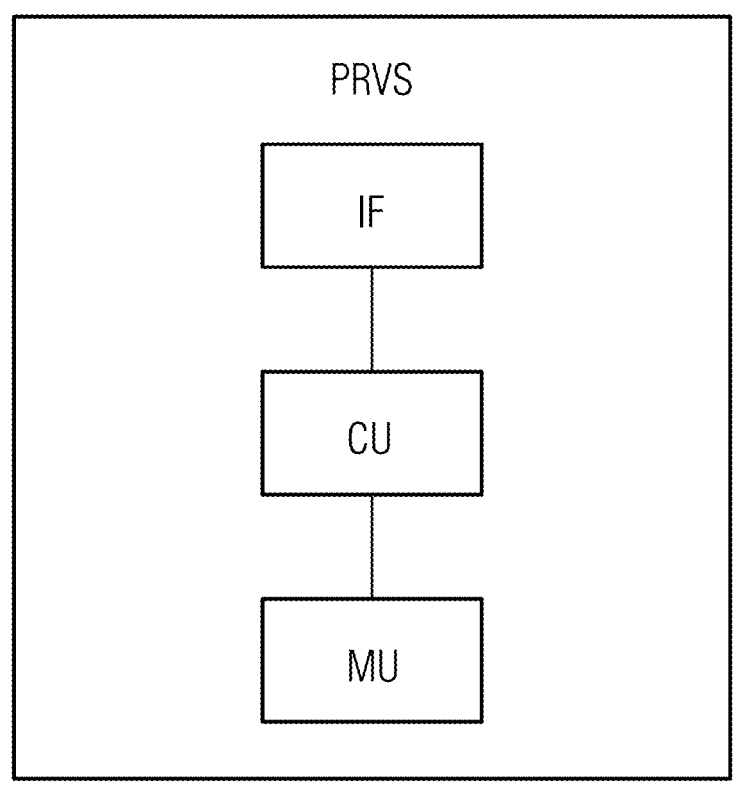
FIG. 9 depicts a schematic diagram of a proposed provision unit, according to an embodiment.

FIG. 9 shows a schematic diagram of an advantageous form of embodiment of a proposed provision unit PRVS. Advantageously, the provision unit PRVS may include a computing unit CU, a memory unit MU, and/or an interface IF. In this case, the provision unit PRVS, in particular the components of the provision unit PRVS, may be embodied for carrying out the individual acts of the proposed method for provision PROV-CD of a comparison dataset CD. In particular, the interface IF may be embodied for provision of the time-resolved first and second dataset PROV-D1, PROV-D2 and for provision of the comparison dataset PROV-CD. The computing unit CU and/or the memory unit MU may further be embodied for spatial SREG-D1-D2 and temporal registration TREG-D1-D2 of the first dataset D1 and second dataset D2, as well as for identification of the difference ID-DIFF between the first and second contrast medium flow.

Figure 10:
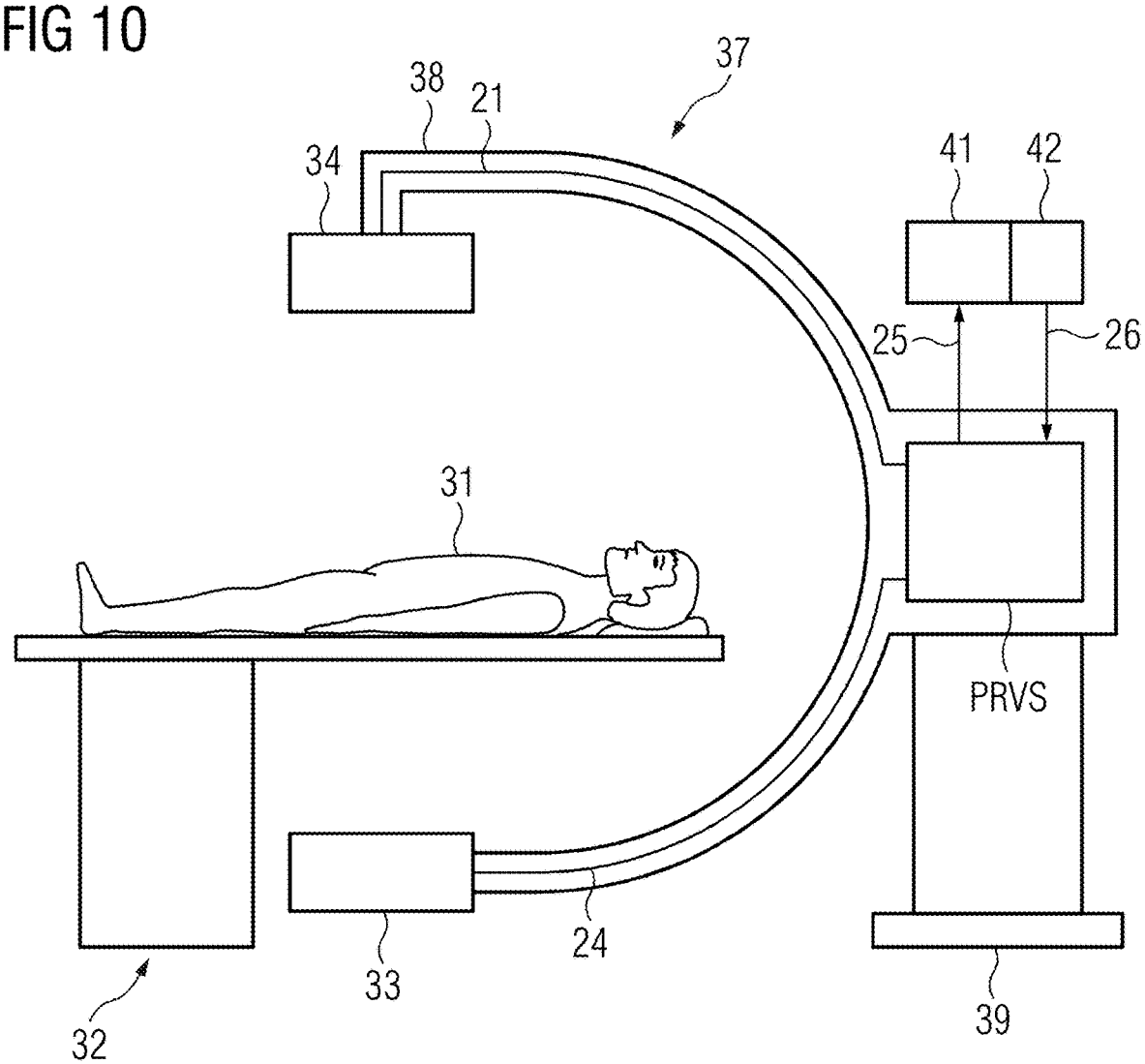
FIG. 10 depicts a schematic diagram of a proposed medical imaging device, according to an embodiment.

FIG. 10 shows, as an example for a proposed medical imaging device, a schematic diagram of a medical C-arm x-ray device 37. Here, the medical C-arm x-ray device 37 advantageously includes a detector 34, in particular an x-ray detector, and an x-ray source 33. Advantageously, the medical C-arm x-ray device 37 may be embodied for recording and/or for provision of the first D1 and second dataset D2. In particular, the medical C-arm x-ray device may be embodied for recording the first image data ID1 including the number of first projection images of the examination object 31 and for recording the second image data ID2 including the number of second projection images of the examination object 31.

For recording the first and second projection images, an arm 38 of the C-arm x-ray device 37 may be supported for movement about one or more axes. The medical C-arm x-ray device 37 may further include a movement apparatus 39, which makes it possible to move the C-arm x-ray device 37 in the room. The provision unit PRVS for recording the first and the second projection images from the examination object 31 arranged on a patient support facility 32, may further send a signal 24 to the x-ray source 33. Subsequently, the x-ray source 33 may emit an x-ray bundle. When the x-ray bundle, after interacting with the examination object 31, strikes a surface of the detector 34, the detector 34 may send a signal 21 to the provision unit PRVS. The provision unit PRVS may receive the first and the second projection images with the aid of the signal 21.

Furthermore, the system may have an input unit 42, (e.g., a keyboard), and the display facility 41, (e.g., a monitor and/or display). The input unit 42 may be integrated into the display facility 41, for example, with a capacitive and/or resistive input display. In this case, an entry of a medical operator at the input unit 42 makes possible a control of the medical C-arm x-ray device 37, in particular of the proposed method for provision PROV-CD of a comparison dataset CD. For this, the input unit 42 may send a signal 26 to the provision unit PRVS, for example.

The display apparatus 41 may advantageously be embodied, in particular for overlaid or side-by-side display of a graphical representation of the registered first D1.REG and/or second dataset D2.REG and/or of the comparison dataset CD, in particular of the at least one parameter characterizing the difference P.DIFF. For this, the provision unit PRVS may send a signal 25 to the display apparatus 41. The at least one display parameter of the display apparatus 41 may further be configured to display graphical representations as a function of the comparison dataset CD, in particular of the at least one parameter characterizing the difference P.DIFF, for example, by color coding.

The schematic diagrams contained in the described figures do not in any way depict a measure of size or relationship of size.

In conclusion, it is pointed out once again that the methods and apparatuses described in detail above merely involve exemplary embodiments, which may be modified by the person skilled in the art in a wide variety of ways, without departing from the area of the disclosure. Furthermore, the use of the indefinite article "a" or "an" does not exclude the features concerned also being able to be present a number of times. Likewise, the terms "unit" and "apparatus" do not exclude the components concerned including a number of interoperating sub-components, which may also be spatially distributed.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the disclosure has been illustrated and described in detail with the help of the embodiments, the disclosure is not limited to the disclosed examples. Other variations may be deduced by those skilled in the art without leaving the scope of protection of the claimed disclosure.

The invention claimed is:

1. A method for providing a comparison dataset, the method comprising:
   providing a time-resolved first dataset, which maps a first contrast medium flow in a region of interest of an examination object in a first period of time;
   providing a time-resolved second dataset, which maps a second contrast medium flow in the region of interest of the examination object in a second period of time after the first period of time;
   spatially registering the first dataset and the second dataset;

identifying a mapping of at least one vessel section of the region of interest in the first dataset and the second dataset with aid of a direction of a mapped flooding of the first contrast medium flow and/or of the second contrast medium flow, temporally registering the first dataset and the second dataset to minimize a temporal difference of the mapped flooding of the first contrast medium flow and the second contrast medium flow in the at least one vessel section, wherein the registered first and second datasets each have a plurality of image points with a time intensity curve;

identifying a difference between the first contrast medium flow and the second contrast medium flow by a comparison of the time intensity curves of image points of the plurality of image points of the registered first and second datasets corresponding spatially to one another, wherein the comparison of the time intensity curves comprises a comparison of a gradient, a variance, an average intensity value, a maximum intensity value, an accumulated intensity value, or a combination thereof of the image points of the registered first and second datasets corresponding spatially to one another; and providing the comparison dataset based on the registered first and second datasets, wherein the comparison dataset has at least one parameter characterizing the difference describing a filling delay and/or a flow rate relationship is determined with aid of the comparison of the time intensity curves of the image points of the registered first and second datasets corresponding spatially to one another.

2. The method of claim 1, wherein the at least one vessel section is an afferent vessel section.

3. The method of claim 1, wherein the providing of the first dataset comprises receiving previously acquired first image data,
wherein the first dataset is reconstructed from the first image data,
wherein the providing of the second dataset comprises receiving previously acquired second image data, and
wherein the second dataset is reconstructed from the second image data.

4. The method of claim 3, wherein the first image data has a plurality of first projection images of the examination object from at least partly different first projection directions,
wherein the first dataset is reconstructed from the plurality of first projection images,
wherein the second image data has a plurality of second projection images of the examination object from at least partly different second projection directions, and
wherein the second dataset is reconstructed from the plurality of second projection images.

5. The method of claim 4, wherein the first image data and/or the second image data has at least one mask image,
wherein the first image data has a plurality of first fill images,
wherein the reconstruction of the first dataset comprises a subtraction of the at least one mask image from the plurality of first fill images,
wherein the second image data has a plurality of second fill images, and wherein the reconstruction of the second dataset comprises a subtraction of the at least one mask image from the plurality of second fill images.

6. The method of claim 3, wherein the first image data and/or the second image data has at least one mask image, wherein the first image data has a plurality of first fill images,
wherein the reconstruction of the first dataset comprises a subtraction of the at least one mask image from the plurality of first fill images,
wherein the second image data has a plurality of second fill images, and wherein the reconstruction of the second dataset comprises a subtraction of the at least one mask image from the plurality of second fill images.

7. The method of claim 1, wherein at least one first image point and at least one second image point in the registered first and second datasets is determined in each case,
wherein the at least one first image point and the at least one second image point map two different spatial positions in the at least one vessel section,
wherein a spatial position mapped by the at least one second image point is arranged downstream in relation to a spatial position mapped by the at least one first image point,
wherein a bolus arrival time is determined in each case as a time of the mapped flooding of the first contrast medium flow and the second contrast medium flow at the spatial position mapped by the at least one second image point, and
wherein the difference is identified based on the bolus arrival times of the at least one second image point and the comparison of the time intensity curves of the at least one first image point of the registered first and second datasets.

8. The method of claim 1, wherein at least one first image point and at least one second image point is defined in each case in the registered first and second datasets,
wherein the at least one first image point and the at least one second image point map two different spatial positions in the at least one vessel section,
wherein the identification of the difference between the first contrast medium flow and the second contrast medium flow comprises:
determining a first relationship between the time intensity curves of the at least one first image point in the registered first and second datasets;
determining a second relationship between the time intensity curves of the at least one second image point in the registered first and second datasets; and
determining a third relationship between the first relationship and the second relationship,
wherein the difference is identified with aid of the third relationship.

9. The method of claim 8, wherein the region of interest has a vessel malformation, a stenosis, an aneurysm, or a combination thereof,
wherein the at least one vessel section is afferent and/or efferent to the vessel malformation, the stenosis, the aneurysm, or a combination thereof,
wherein the at least one first image point maps a spatial position within or proximal and the at least one second image point a spatial position distal in relation to the vessel malformation, the stenosis, the aneurysm, or a combination thereof in each case, or
wherein the at least one first image point in each case maps a spatial position proximal and the at least one second image point a spatial position within in relation to the vessel malformation the stenosis and/or the aneurysm.

10. The method of claim 7, wherein the region of interest has a vessel malformation, a stenosis, an aneurysm, or a combination thereof,
wherein the at least one vessel section is afferent and/or efferent to the vessel malformation, the stenosis, the aneurysm, or a combination thereof,
wherein the at least one first image point maps a spatial position within or proximal and the at least one second image point a spatial position distal in relation to the vessel malformation, the stenosis, the aneurysm, or a combination thereof in each case, or
wherein the at least one first image point in each case maps a spatial position proximal and the at least one second image point a spatial position within in relation to the vessel malformation the stenosis and/or the aneurysm.

11. The method of claim 1, wherein an injection parameter of the first contrast medium flow and of the second contrast medium flow is received in each case,
wherein the time intensity curves are normalized based on the injection parameters,
wherein the identifying of the difference between the first contrast medium flow and the second contrast medium flow comprises a comparison of the normalized time intensity curves of image points of the registered first and second datasets corresponding spatially to one another.

12. A system comprising:
a computing unit and a memory configured to:
provide a time-resolved first dataset, which maps a first contrast medium flow in a region of interest of an examination object in a first period of time;
provide a time-resolved second dataset, which maps a second contrast medium flow in the region of interest of the examination object in a second period of time after the first period of time;
spatially register the first dataset and the second dataset;
identify a mapping of at least one vessel section of the region of interest in the first dataset and the second dataset with aid of a direction of a mapped flooding of the first contrast medium flow and/or of the second contrast medium flow;
temporally register the first dataset and the second dataset to minimize a temporal difference of the mapped flooding of the first contrast medium flow and the second contrast medium flow in the at least one vessel section, wherein the registered first and second datasets each have a plurality of image points with a time intensity curve;
identify a difference between the first contrast medium flow and the second contrast medium flow by a comparison of the time intensity curves of image points of the plurality of image points of the registered first and second datasets corresponding spatially to one another, wherein the comparison of the time intensity curves comprises a comparison of a gradient, a variance, an average intensity value, a maximum intensity value, an accumulated intensity value, or a combination thereof of the image points of the registered first and second datasets corresponding spatially to one another; and
provide a comparison dataset based on the registered first and second datasets,
wherein the comparison dataset has at least one parameter characterizing the difference describing a filling delay and/or a flow rate relationship is determined with aid of the comparison of the time intensity curves of the image points of the registered first and second datasets corresponding spatially to one another.

13. A medical imaging device comprising:
a computing unit and a memory configured to:
provide a time-resolved first dataset, which maps a first contrast medium flow in a region of interest of an examination object in a first period of time;
provide a time-resolved second dataset, which maps a second contrast medium flow in the region of interest of the examination object in a second period of time after the first period of time;
spatially register the first dataset and the second dataset;
identify a mapping of at least one vessel section of the region of interest in the first dataset and the second dataset with aid of a direction of a mapped flooding of the first contrast medium flow and/or of the second contrast medium flow;
temporally register the first dataset and the second dataset to minimize a temporal difference of the mapped flooding of the first contrast medium flow and the second contrast medium flow in the at least one vessel section, wherein the registered first and second datasets each have a plurality of image points with a time intensity curve;
identify a difference between the first contrast medium flow and the second contrast medium flow by a comparison of the time intensity curves of image points of the plurality of image points of the registered first and second datasets corresponding spatially to one another, wherein the comparison of the time intensity curves comprises a comparison of a gradient, a variance, an average intensity value, a maximum intensity value, an accumulated intensity value, or a combination thereof of the image points of the registered first and second datasets corresponding spatially to one another; and
provide a comparison dataset based on the registered first and second datasets,
wherein the comparison dataset has at least one parameter characterizing the difference describing a filling delay and/or a flow rate relationship is determined with aid of the comparison of the time intensity curves of the image points of the registered first and second datasets corresponding spatially to one another, and
wherein the medical imaging device is configured to receive and/or provide the first dataset and the second dataset.

* * * * *